United States Patent [19]
Fork

[11] Patent Number: 5,699,191
[45] Date of Patent: Dec. 16, 1997

[54] NARROW-PITCH BEAM HOMOGENIZER

[75] Inventor: David K. Fork, Palo Alto, Calif.

[73] Assignee: Xerox Corporation, Stamford, Conn.

[21] Appl. No.: 736,519

[22] Filed: Oct. 24, 1996

[51] Int. Cl.[6] .................................... G02B 27/10
[52] U.S. Cl. ........................................... 359/626
[58] Field of Search .................. 359/455, 619, 359/626

[56] References Cited

U.S. PATENT DOCUMENTS

| | | | |
|---|---|---|---|
| 3,670,260 | 6/1972 | Koester et al. | 331/94.5 |
| 4,367,009 | 1/1983 | Suzki | 350/6.5 |
| 4,370,026 | 1/1983 | Dubroeucq et al. | 350/163 |
| 4,458,994 | 7/1984 | Jain et al. | 354/4 |
| 4,497,013 | 1/1985 | Ohta | 362/32 |
| 4,497,015 | 1/1985 | Konno et al. | 362/268 |
| 4,793,694 | 12/1988 | Liu | 350/379 |
| 4,811,328 | 3/1989 | Ito et al. | 369/112 |
| 4,851,978 | 7/1989 | Ichihara | 362/268 |
| 4,918,583 | 4/1990 | Kudo et al. | 362/268 |
| 4,939,630 | 7/1990 | Kikuchi et al. | 362/268 |
| 4,974,919 | 12/1990 | Muraki et al. | 350/6.6 |
| 5,153,773 | 10/1992 | Muraki et al. | 359/619 |
| 5,357,365 | 10/1994 | Ipposhi et al. | 359/205 |

*Primary Examiner*—David C. Nelms
*Assistant Examiner*—Thomas Robbins
*Attorney, Agent, or Firm*—Christine S. Lam

[57] ABSTRACT

A homogenizer for a laser irradiation apparatus which provides single-pulse homogeneity by using optical components which result in an interference pitch which is smaller than the thermal diffusion length of the target material. Under this invention, the non-uniform heat distribution from a laser beam can be averaged out through thermal diffusion, achieving single-pulse homogeneity.

17 Claims, 2 Drawing Sheets

NARROW-PITCH BEAM HOMOGENIZER

FIELD OF INVENTION

The present invention relates generally to a laser irradiation apparatus. More specifically, the invention relates to a beam homogenizer for a laser irradiation apparatus.

BACKGROUND OF INVENTION

Semiconductor devices are conventionally fabricated upon crystalline semiconductor substrates, which are available in a limited range of sizes. For instance, currently monocrystalline silicon substrates are generally available only in diameters of about six to eight inches. In order to fabricate low cost, large area displays or sensors, the array of active electronic elements is typically fabricated using semiconductor films on non-crystalline insulating substrates such as glass. For instance, amorphous silicon thin films deposited on glass are used for fabricating thin film devices, which have wide applications in acoustic ink jet printing, active matrix displays, and large area scanners.

A disadvantage of devices formed in amorphous silicon thin films is their low carrier mobilities compared to devices formed in polycrystalline or crystalline thin films. Therefore, substantial effort has been expended towards the formation of crystalline thin films on non-crystalline substrates such as glass. One approach is to deposit a layer of amorphous silicon film on a glass substrate and irradiate the film with a laser source. The energy from the laser first melts the amorphous film, which is then resolidified into a crystalline or polycrystalline form. One such technique is described in U.S. Pat. No. 5,357,365 entitled "Laser Beam Irradiating Apparatus Enabling Uniform Annealing" invented by Ipposhi et al.

A problem which often arises when a laser is used to form crystalline thin films is that there often are variations across the resulting film's electrical or material characteristic or both. The variations probably stem from the non-uniform intensity distribution of a laser light. Generally, the intensity of a laser beam has a Gaussian distribution, peaking at the center of the beam and tailing off towards the circumference of the beam. To achieve better uniformity in light intensity, a homogenizer is often used. In a typical homogenizer, the laser beam is often divided into multiple wavelets, which are then redirected to different positions and overlapped back to produce a beam with a non-Gaussian distribution. Such approaches are sometimes referred to as "beam-folding" techniques. An example of a "beam-folding" technique is described in U.S. Pat. No. 4,811,328 entitled "Optical Recording and Reproducing Device" by Ito et al. However, a typical "beam folding" technique creates an undesirable effect, making its usage difficult in applications where a high degree of uniformity in intensity is required such as crystallization of semiconductor materials. The overlapping beams resulting from such a technique interfere to form a standing wave pattern which creates an intensity modulation or an interference fringe pattern. This intensity modulation or interference pattern in turn creates non-uniformities in the material and/or electrical characteristics in the target material which has been irradiated.

This intensity modulation problem, also referred to as the "standing wave problem," has been widely observed in photolithography processes using coherent light sources such as lasers. The intensity modulation causes non-uniformity from one location to another in the degree to which a photoresist layer is exposed. One approach to resolve this problem in the photolithography area is to use a homogenizer which incorporates a mechanism by which the laser moves or scans the target material during the exposure. Since multiple pulses are typically required to expose a photoresist area, each pulse in the series of pulses is spatially offset relative to the next pulse. By moving the laser during an exposure, better uniformity when exposing photoresist is achieved because the interference fringe patterns of all the pulses are averaged out.

An example of such an approach to resolve the "standing-wave" problem is described in U.S. Pat. No. 5,153,773 entitled "Illumination Device Including Amplitude-Division and Bee Movement" invented by Muraki, which teaches the use of a scanning fly-eye homogenizer. Under such an approach, the amplitude of the light from a laser source is first divided into two light beams, after which the light beams are inputted to a rotating wedge prism which is used to shift their paths and their positions of incidence. By imparting an optical path difference and by shifting the positions of the beams, mutually incoherent light beams are produced and directed to the optical integrator so as to avoid or minimize the formation of an interference fringe pattern at the target. Another approach which uses a vibrating mirror to form a substantially incoherent light source is described in U.S. Pat. No. 4,851,978 entitled "Illumination Device Using a Laser" by Ichihara.

However, typical techniques used to improve uniformity in photolithography processes are generally not applicable to the crystallization of semiconductor materials. Unlike photoresist, semiconductor materials such as silicon are poor "pulse-to-pulse integrators." In other words, if a photoresist layer is irradiated by multiple pulses, the integrated cumulative irradiation of all the pulses would determine the degree to which the photoresist has been exposed. During the exposure process, each laser pulse incrementally increases the degree to which the photoresist has been exposed. In contrast, if multiple pulses are applied to a semiconductor target such as silicon, the total energy transferred to the silicon does not determine the material and electrical characteristics of the silicon target. Because silicon has a fast and non-linear response to light intensity or process fluence, the characteristics of the target are primarily determined by the energy output of the last pulse incident upon the sample. The response time of silicon is so fast that during each pulse, the silicon film melts and recrystallizes to an extent determined by the output energy of that particular pulse. Since the pulse length of a laser shot is approximately 30 nanoseconds, homogenizers which use a moving optical part to smear out the interference patterns of the pulses such as described in the Muraki patent or the Ichihara patent are not generally applicable to crystallization of semiconductor materials. Because of the fast response time of silicon, laser crystallization of silicon requires the intensity of each pulse to be homogeneous. However, mechanical parts generally cannot rotate or move adequately fast to achieve single-pulse homogeneity. Accordingly, there is a need to develop a homogenizer for a laser irradiation apparatus which can be used for the crystallization or annealing of semiconductors.

BRIEF SUMMARY OF INVENTION

The present invention relates to a homogenizer for a laser irradiation apparatus which improves the single-pulse homogeneity of a laser beam. The present invention achieves single-pulse homogeneity by controlling the distance between adjacent maxima of the interference pattern of a single pulse, which is often known as the "interference pitch." Under this approach, if the interference pitch is smaller than or on the order of the thermal diffusion length of the target material, the non-uniform heat distribution can be averaged out through thermal diffusion, providing single pulse homogeneity.

An advantage of this invention is that it produces single-pulse homogeneity in a laser beam, which in turn results in greater uniformities in the material and electrical characteristics of the target film.

Another advantage of the present invention is that the homogenizer does not require any moving optical parts such as a rotating mirror or vibrating mirror. The absence of any moving optical part improves the reliability the homogenizer and reproducibly of the material and electrical characteristics of the target material.

Yet another advantage of this invention is that this invention allows for the fabrication of high performance thin film devices for use in printing, active matrix displays, and large area scanners.

The advantages and objects of the present invention will become apparent to those skilled in the art from the following detailed description of the invention, its preferred embodiments, the accompanying drawings, and the appended claims.

DETAILED DESCRIPTION OF PREFERRED EMBODIMENT

Figure 1:
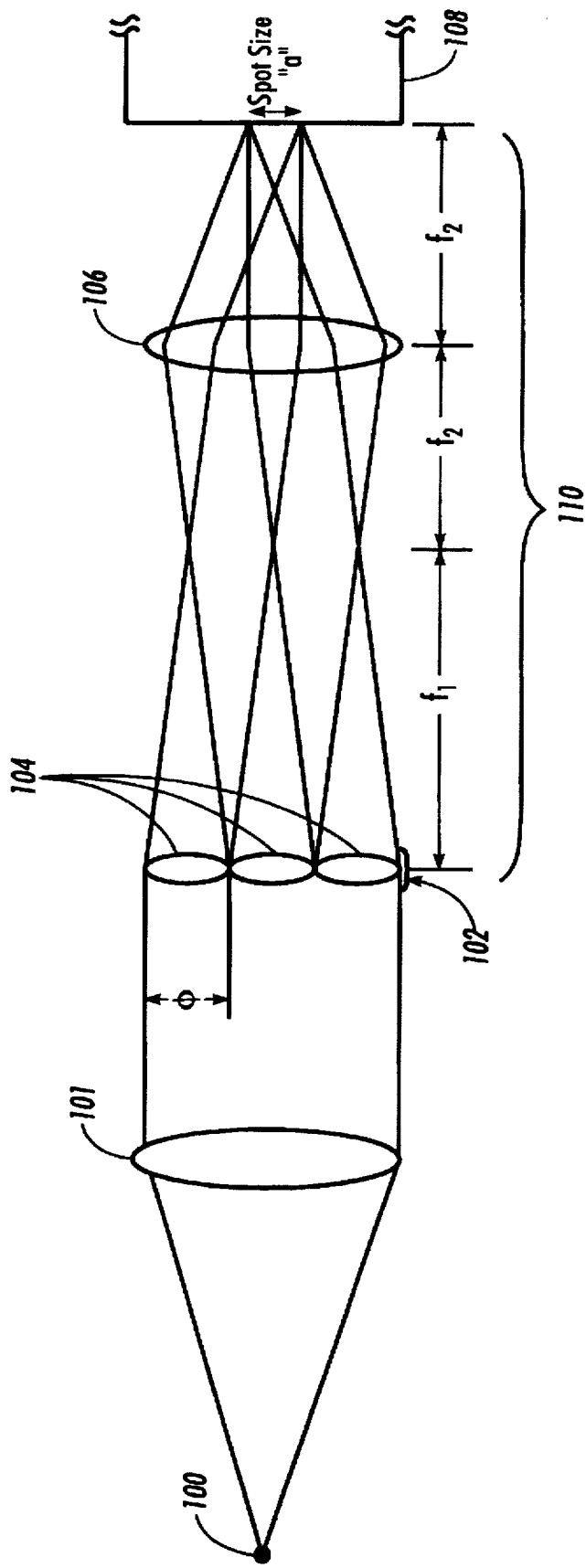
FIG. 1 shows a schematic view illustrating a laser irradiation apparatus according to the preferred embodiment of the present invention.

FIG. 1 illustrates the preferred embodiment of the present invention. Under this approach, light from a coherent light source 100 passes through a beam expander 101, which expands the light beam and directs it towards a "fly-eye" integrator 102. The fly-eye integrator 102 is made up of multiple microlenses 104, each of which has focal length $f_1$ and a diameter of $\phi$ (phi). Before the expanded light beam strikes the fly-eye integrator 102, the beam remains coherent. The microlenses 104 of the integrator 102 then divide the expanded light beam into multiple wavelets, each of which has a smaller cross-section than the original beam. Nothing in this invention requires the use of a beam expander. For instance, an excimer laser beam typically has a cross section of several centimeters as it exits the laser cavity, and therefore a beam expander may not be necessary. In addition, other beam expanding techniques known to those of ordinary skill in the art may also be used. A typical laser source produces a beam with a dimension of approximately 25 mm to 35 mm in diameter, which is usually divided into four to ten wavelets in each direction, totaling 16 to 100 wavelets in all directions. When a beam expander 101 is placed in front of the homogenizer unit 110, even more wavelets can be generated.

After the integrator 102 has divided the expanded beam, the resulting wavelets are then collected and overlapped by a condenser lens 106 with a focal length of $f_2$. When the wavelets pass through the condenser lens 106, they are redirected to form a single beam with a spot size indicated by "a" in FIG. 1. The redirected beam has improved intensity uniformity, i.e., a more homogenized beam. When the redirected beam strikes the target film 108, the beam will melt the film 108 and resolidify it into a crystalline or polycrystalline form.

Figure 2:
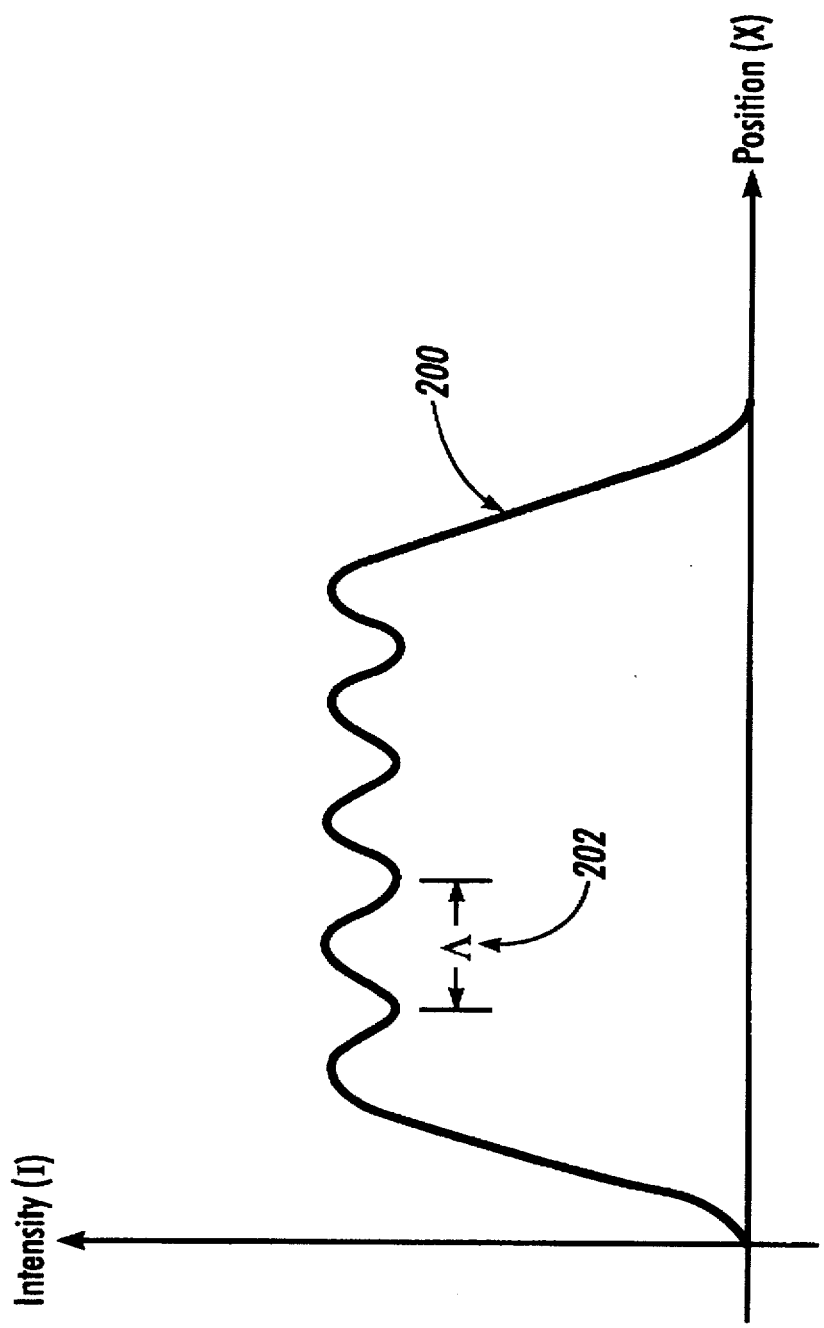
FIG. 2 shows a graphical representation of the intensity profile of a laser beam at the target material versus the radial position within the beam.

FIG. 2 shows a graphical representation of the intensity profile at the target material versus the radial position in the beam. Under the present approach, the design of the integrator 102 and the condenser 106 of the homogenizer unit 110 should be such that the interference pitch ($\Lambda$), which is also known as the modulation pitch, formed by the overlapping wavelets is smaller than the thermal diffusion length ($\delta$) of the target film. Generally, if the interference pitch is smaller than or on the order of magnitude of the diffusion length, the heat produced by the laser beam can flow in the target material when it is still in its liquid state, averaging out the difference between the maxima and minima of an interference pattern.

The thermal diffusion length ($\delta$) of a material depends upon the thermal diffusivity (D) of the material and time (t) for which diffusion can occur under the relationship:

$$\delta = (D\Delta t)^{1/2}$$

where $\Delta t$ represents the time during which the target material remains molten.

Generally, the interference pitch ($\Lambda$), which is also known as the modulation pitch, at the target semiconductor film 108 is a function of the wavelength ($\lambda$) of the coherent light source 100, the focal length ($f_2$) of the condenser lens 106, and the diameter ($\phi$) of each of the microlenses 104. These parameters are related as follows:

$$\Lambda = \lambda f_2 / \phi.$$

Other secondary factors which may also affect the interference pitch and the thermal diffusion length of the target material include, but not limited, to the following: (i) the thickness, temperature, and thermal diffusivity of the substrate on which the film resides, (ii) the properties of the thermal boundary between the target material and the substrate, and (iii) the pulse length of the laser. For instance, the thermal diffusion length may be increased by heating the target material. According to the relationship of the parameters set forth above, to achieve small interference pitch, the focal length ($f_2$) of the condenser lens 106 should be as small as possible and the diameter ($\phi$) of each lens elements in the fly-eye integrator 102 should be as large as possible.

Under the preferred embodiment, the homogenizer is designed such that the resulting interference pitch is no greater than approximately two thermal diffusion lengths of the target material. For instance, a XeCl laser, which outputs a wavelength of 308 nanometers, can be used to irradiate an amorphous silicon film of 100 nanometers on a quartz substrate. A typical laser pulse is about 30 nanoseconds. The duration for which the silicon film remains in its liquid state depends upon the energy density of the incident light source. The thermal diffusion length ($\delta$) of molten silicon was found to be approximately one (1) micron. Under this embodiment, a desirable interference pitch ($\Lambda$) would be approximately two microns. Hence, assuming that the interference pitch ($\Lambda$) is 2 μm and the wavelength is 308 nanometers, $f_2/\phi$ should be approximately 6.5.

The spot size of the laser beam (a) provides an additional constraint, which is governed by the following relationship:

$$a = \phi(f_2/f_1).$$

Generally, the required energy density determines the spot size (a) required. For example, if the laser source produces a pulse energy of 400 mJ and if the required energy density is 500 mJ/cm$^2$, then the required spot size is about 9 mm.

A possible focal length $f_2$ for the condenser lens 106 is to be 150 millimeters (mm) which provides a reasonable depth of field. Applying the three relationships set forth above, the parameters, $\phi$, $f_1$ and $f_2$, of the optical components of the homogenizer are 23 mm, 383 mm and 150 mm respectively. As discussed previously, process uniformity achievable by the present invention will further improve if the interference pitch is further decreased.

The parameters such as focal lengths, types of lens, dimensions of lens given above are exemplary only and variations in these parameters are permissible. Additionally, other optical components in addition to the ones shown in the figures may also be included. Lastly, the present invention also applies to other semiconductor materials.

While the invention has been described in conjunction with specific embodiments, it is evident to those skilled in the art that many alternatives, modifications, and variations will be apparent in light of the foregoing description. Accordingly, the invention is intended to embrace all such alternatives, modifications, and variations that fall within the spirit and scope of the appended claims.

What is claimed is:

1. An irradiation apparatus, comprising:

(a) a radiation source for emitting a coherent beam;

(b) a first optical system for dividing said coherent beam into a plurality of wavelets; and (c) a second optical system for directing and superimposing said plurality of wavelets upon one another forming a substantially homogenized beam on a surface of an object to be irradiated, wherein said substantially homogenized beam has an associated interference pitch which is smaller than or on the order of the thermal diffusion length of said object to be irradiated.

2. The irradiation apparatus of claim 1 wherein said first optical system comprises of an array of lens elements, each of which is associated with one of said plurality of wavelets.

3. The irradiation apparatus of claim 2 wherein said array of lens elements is a "fly-eye" array.

4. The irradiation apparatus of claim 2 wherein said second optical system having a focal length which meets the following condition:

$$f_2 \leq [2\delta \times (\phi)]/\lambda$$

where $f_2$ is said focal length of said second optical system, $\delta$ is said thermal diffusion length of said object to be irradiated, and $\lambda$ is the wavelength of said coherent beam and $\phi$ is the diameter of one of said array of lens elements.

5. The irradiation apparatus of claim 1 wherein said second optical system comprises a condenser lens.

6. The irradiation apparatus of claim 1 wherein said object is a semiconductor material.

7. The irradiation apparatus of claim 6 wherein said semiconductor material is silicon.

8. The irradiation apparatus of claim 1 wherein said radiation source is an excimer laser.

9. A method of irradiating a target object, comprising the steps of:

(a) passing a coherent light beam through a first optical system which divides said coherent light beam into a plurality of wavelets;

(b) passing said plurality of wavelets through a second optical system which directs and superimposes said plurality of wavelets upon one another forming a substantially incoherent beam, wherein said substantially incoherent beam has an associated interference pitch; and (c) irradiating said target object with said substantially homogenized beam, wherein said interference pitch of said substantially homogenized beam is smaller than or on the order of the thermal diffusion length of said target object.

10. The method of claim 9 comprising the further steps of:

(a) melting a surface layer of said target object; and (b) resolidifying said surface layer of said target object into a substantially crystalline form.

11. The method of claim 9 wherein said first optical system comprises an array of lens elements, each of which is associated with one of said plurality of wavelets.

12. The method of claim 11 wherein said array of lens elements is a "fly-eye" array.

13. The method of claim 11 wherein said second optical system having a focal length which meets the following condition:

$$f_2 \leq [2\delta \times \phi]/\lambda$$

where $f_2$ is said focal length of said second optical system, $\delta$ is said thermal diffusion length of said object, and $\lambda$ is the wavelength of said coherent beam and $\phi$ is the diameter of one of said array of lens elements.

14. The method of claim 9 wherein said second optical system comprises a condenser lens.

15. The method of claim 9 wherein said object is a semiconductor material.

16. The method of claim 15 wherein said semiconductor material is silicon.

17. The method of claim 9 wherein said radiation source is an excimer laser.

* * * * *